United States Patent Office 3,464,279
Patented Sept. 2, 1969

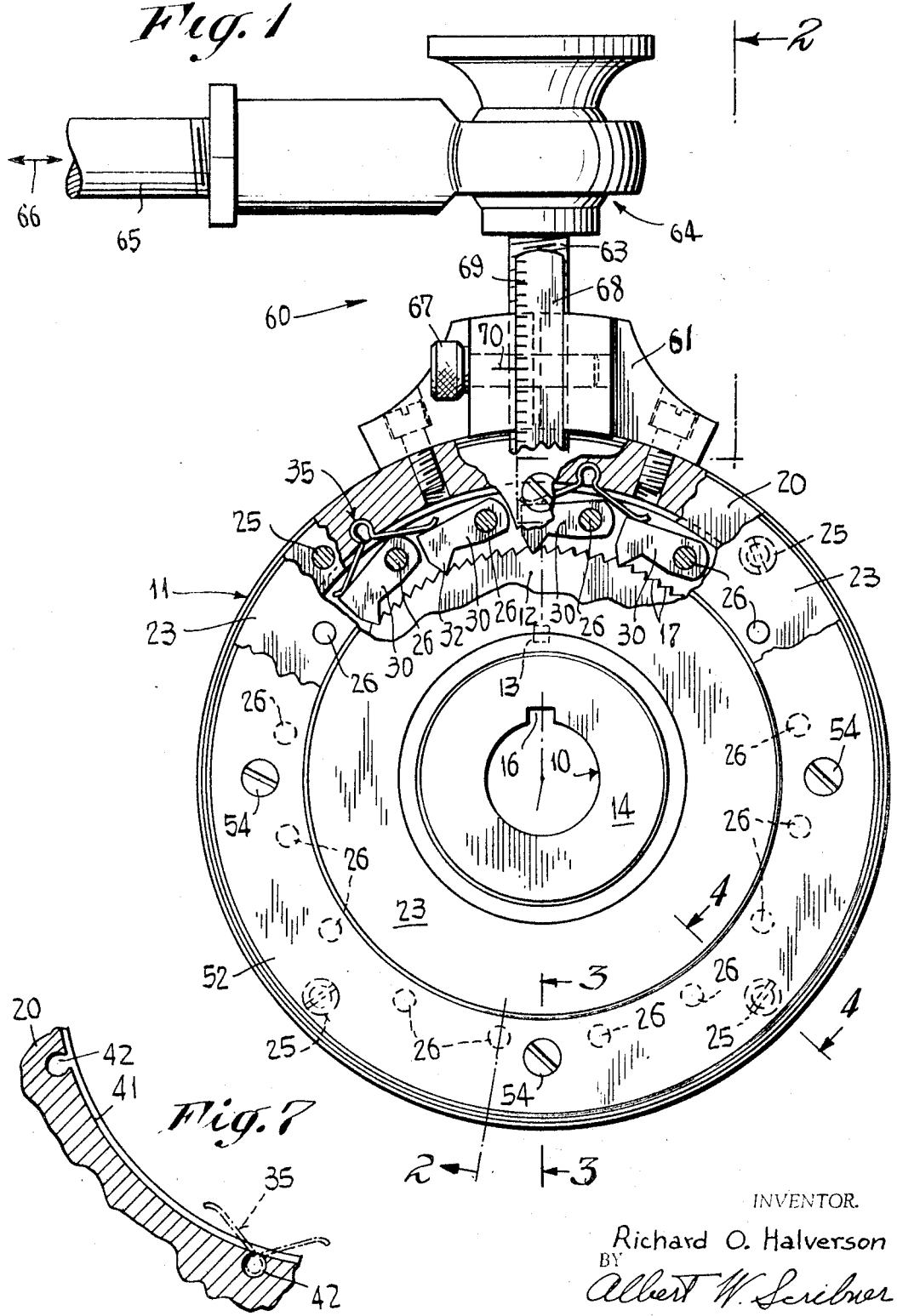

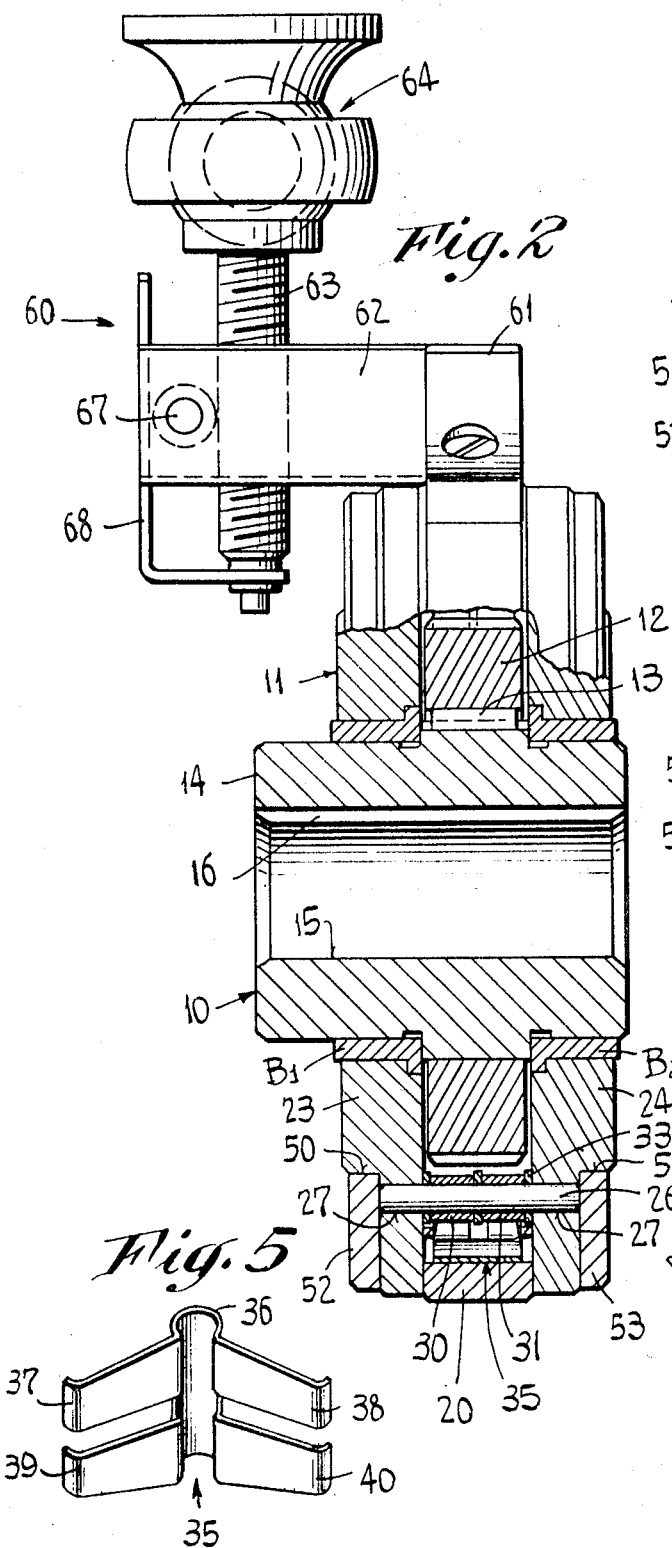

3,464,279
ROLL FEED CLUTCH
Richard O. Halverson, Cranston, R.I., assignor to Albert W. Scribner, Darien, Conn, and Halvar Associates, East Providence, R.I., a corporation of Rhode Island
Filed Sept. 29, 1967, Ser. No. 671,624
Int. Cl. F16h 27/02
U.S. Cl. 74—126                                    5 Claims

ABSTRACT OF THE DISCLOSURE

The instant ratchet type roll feed clutch has an oscillatably actuated housing unit that includes two circular sets of pivotally mounted pawls, the pawls being adapted to selectively drive a ratchet wheel unit that is rotatably mounted in said housing unit. The pawls are biased into engagement with the ratchet wheel by leaf springs each of which has four cantilever type legs, and the otherwise exposed axial ends of the pins supporting said pawls are covered and retained in the housing unit by a pair of rings that are removably secured to the opposed radial faces of said housing unit.

ROLL FEED CLUTCH

This invention relates to an improved ratchet type roll feed clutch. More particularly the invention relates to a ratchet and multiple pawl type of roll feed clutch having a novel construction and arrangement that greatly facilitates the assembly, maintenance and adjustment of the clutch unit.

Presently available ratchet type roll feed clutches are for the most part very difficult to service in the field because special tools are required to accommodate the relatively complex housing and pin arrangements in said clutches. This condition necessitates these clutch units being returned to the factory when repairs are desired or required, and this in turn can result in a down-time for the user's roll feed equipment and related machinery such as punch presses and the like.

The present invention contemplates overcoming these difficulties by providing a simplified ratchet type clutch having an improved construction and arrangement of parts which allows the unit to be readily disassembled and resassembled at the site of use so that most any required inspection, repair and/or part replacement may be quickly and easily made.

The primary object of the instant invention is to provide a more efficient ratchet type clutch arrangement wherein the clutch housing is arranged so as to afford ready access to the ratchet pawl supporting pins and the pawl biasing springs.

Another object of the invention is to provide a novel pawl biasing means wherein each of a plurality of individual leaf spring means is adapted to yieldably bias several adjacent pawls into operative driving engagement with the clutch ratchet wheel.

A further object of the invention is to provide a relatively low-cost ratchet type roll feed clutch wherein the various parts are constructed and arranged in a simplified and more efficient manner.

Other objects of the invention will become apparent as the disclosure progresses.

In the drawings:
FIG. 1 is a front elevation view in partial section and illustrates the ratchet wheel and pawl arrangement for the instant clutch.

FIG. 2 is a side elevation view taken in partial section along a section line 2—2 of FIG. 1.

FIG. 3 is a fragmentary sectional view taken along section line 3—3 of FIG. 1.

FIG. 4 is a fragmentary sectional view taken along the section line 4—4 of FIG. 1.

FIGS. 5 and 6 are perspective and front elevation views respectively and illustrate the construction of the instant pawl biasing leaf springs.

FIG. 7 is a fragmentary view diagrammatically illustrating the spring retaining recesses formed in the instant housing.

Referring to FIGS. 1 and 2 there is shown a ratchet type roll feed clutch that includes a ratchet wheel unit 10 and a housing and driving pawl unit 11. The ratchet wheel unit 10 comprises an annular ratchet wheel 12 that is rotatively secured by means of a suitable key 13 to a tubular hub 14. The axially elongated hub 14 is formed with an axial bore 15 therethrough and a related internal keyway 16 whereby the instant clutch may be mounted on and secured to the shaft that is to be intermittently rotatively driven in response to the oscillation of the said housing unit 11. The periphery of the ratchet wheel 12 is formed with a plurality of equally spaced and relatively fine ratchet teeth 17.

The housing and driving pawl unit 11 comprises a central annulus or main housing ring 20 having parallel opposed radial surfaces 21 and 22, FIG. 3. A pair of disc-like side plates 23 and 24 are secured to said opposed surfaces 21 and 22 respectively by means of screws 25, FIGS. 1 and 4. As will be apparent from FIG. 2 the shoulder portions of the tubular hub 14 on either side of the ratchet wheel 12 are coaxially and rotatably supported on and between the side plates 23, 24 by any suitable type bearing means such as bushings B1 and B2. A set of sixteen pawl supporting pins 26 are mounted on and between said side plates 23, 24, each of said pins extending through a related pair of axially aligned holes 27 drilled through the respective side plates 23, 24 as is best illustrated in FIG. 2. On each pin 26 there is pivotally mounted a pair of drive pawls 30, 31; each pawl having a tooth or nose 32, FIG. 1, formed thereon that is adapted to drivingly cooperate in the usual ratcheting manner with the teeth 17 of said ratchet wheel. Suitable shim washers, such as 33, FIG. 2, are provided on pins 26 on both sides of each of said pawls. There are thus two operative sets of pawls in the instant housing unit, the first set being arranged in a circular array and being coplanar with respect to the pawl 30 illustrated in FIG. 2; the second set also being arranged in a circular array and being coplanar with respect to the pawl 31 illustrated in FIG. 2. As may be seen from FIG. 2 the effective combined width of two laterally adjacent drive pawls is just slightly less than the corresponding width dimensions of each ratchet tooth 17. The circumferential spacing of the pawl pins 26, the relative lengths of the pawls in the said two sets, the number of teeth 17 in the ratchet wheel unit 10, etc., may correspond to that described in U.S. Patent No. 2,591,993.

The various drive pawls of the instant housing unit 11 are yieldably biased so that the respective pawl noses 32 are urged into operative engagement with said ratchet teeth 17. A novel pawl biasing means is provided here and comprises eight leaf spring 35, each of which is adapted to operatively engage and bias a set of four adjacent pawls 30, 31. Each leaf spring 35 comprises a central bowed body portion 36 and four cantilever type spring legs 37, 38, 39, 40, extending away therefrom as is illustrated in detail in FIGS. 5 and 6. Each leaf spring 35 is mounted in the housing unit 11 in the following manner. The radially inner surface 41, FIG. 7, of the main annular housing ring 20 is formed with eight circumferentially spaced cylindrical recesses 42. The cross sectional shape of each of these recesses, as illustrated in FIG. 7, is such that the bowed central portion 36 of the associated leaf spring 35 may be snapped thereinto whereby said spring is restrained from bodily movement relative to clutch housing and each of the four cantilever legs of said leaf spring bears against one of a set of four related pawls 30, 31. Each such set of four pawls includes two circumferentially adjacent pawls 30 and a corresponding laterally adjacent pair of circumferentially adjacent pawls 31. Thus the thirty-two pawls of the instant roll feed clutch are yieldably urged into engagement with the said ratchet teeth 17 by the eight leaf springs 35.

The radially and axially outer portion of each of the disc-like side plates 23 and 24 in the region of the exposed ends of said pawl support pins 26 and related bores 27 is formed with shoulders 50 and 51, respectively. On these shoulders are mounted two retaining rings 52 and 53 which are respectively secured to the said side plates 23, 24 by means of screws 54, FIGS. 1 and 3. When thus secured to the housing unit 11, the rings 52, 53 cover and axially retain both of the otherwise exposed axial ends of each pawl supporting pin 26 as is best seen in FIG. 2, and also retain said screws 25 in place as is best illustrated in FIG. 4.

The operation of the instant device is readily apparent from FIG. 1 whereby ratchet unit 10, in being mounted on and keyed to the shaft to be driven, is adapted to be rotatably actuated in intermittent counterclockwise steps in response to the arcuate oscillation of the housing unit 11. Here of course pawls 30, 31 will when moving in a counterclockwise direction as seen in FIG. 1 correspondingly drive the ratchet wheel; and will when moving in a clockwise direction as seen in FIG. 1 simply idlingly ratchet back over the now stationary teeth 17 of the ratchet wheel unit 10. In this manner the load member to be driven by the instant clutch mechanism (such as a pair of work feed rolls for a punch press or the like) is adapted to incrementally advance the rotary position of the load member.

Any suitable linkage means such as illustrated at 60, FIGS. 1 and 2, may be used to oscillatively actuate the housing unit 11. Such means 60 here comprises a radial arm 61, FIG. 1, that is fixedly secured by suitable screws or the like to the outer surface of the central housing ring 20. Arm 61 is provided with a lateral extension 62 that threadedly receives a bolt 63. To the outer end of bolt 63 is connected any suitable universal or spherical type coupling 64 that is in turn connected to the reciprocating driving rod 65. As will be apparent when rod 65 is reciprocated, as indicated by arrows 66 of FIG. 1, the housing unit 11 will be correspondingly rotatively oscillated and the ratchet wheel and load member correspondingly intermittently advanced. The free end of said arm extension 62 is split so as to be adapted to clamp, by means of a suitable locking screw 67 of FIGS. 1, 2, the bolt 63 in radially adjusted position. This threaded arrangement permits fine adjustments in the arcuate stroke length of the housing unit 11 for a given stroke length of reciprocation 66 of said actuating rod 65. For facilitating this fine stroke adjustment a vernier slide 68 may be mounted for movement with bolt 63, said slide being provided with a suitable scale 69 that cooperates with a datum mark 70 located on the adjacent portion of the said arm extension 62.

It will be noted that the instant device is not only relatively easy to assemble but further may be readily disassembled in the event that any repair or part replacement becomes necessary. Here for example the ring 52 and side plate 23 may be removed so that any one of the pins 26, pawls 30, 31 or springs 35 readily replaced and the said plate and ring thereafter quickly and easily replaced. In this manner repairs may be made at the site of use of the instant clutch with very little accompanying down-time for the associated punch press or similar machinery. Thus the heretofore necessity of having to return a clutch of this instant type to the manufacturer for repairs is eliminated along with a possible prolonged non-productive "down-time" period of said machinery.

It will be apparent that many variations and modifications in the invention may be made without departing from the spirit and scope of said invention as defined by the hereinafter claims.

I claim:
1. A ratchet type roll feed clutch comprising:
an annular central housing member;
a pair of disc-like side plates respectively secured to the opposite outer side faces of said central housing member;
a ratchet wheel rotatably mounted on and between said side plates, said ratchet wheel being disposed within said central housing member and having a plurality of teeth formed on the periphery thereof;
said side plates having a circular array of small bores formed therethrough, each such bore in one of said side plates being axially aligned with a related bore formed in the other side plate;
a pivot pin disposed in each of said related pairs of small bores, the axial outer ends of said pins being respectively exposed at the outer faces of said side plates;
a pair of pawls pivotally mounted on each of said pins and adapted to drivingly cooperate with said peripheral teeth on said ratchet wheel;
a plurality of leaf springs mounted on said central housing member, each leaf spring having a plurality of flexible cantilever type ends which respectively engage a related set of said pawls so as to yieldably bias the latter towards said teeth of said ratchet wheel; and
a pair of rings respectively secured to the outer radial faces of said side plates so as to respectively cover and retain the exposed axial ends of said pivot pins in said bores.

2. Apparatus as defined by claim 1 wherein each of said leaf springs has a bowed central body portion and a plurality of cantilever type legs extending away from said body portion, and wherein the radially inner surface of said central housing member is provided with a plurality of accurately spaced recesses that are respectively adapted to receive and retain the bowed central body portions of said leaf springs.

3. Apparatus as defined by claim 1 wherein each of leaf springs has two opposed pairs of flexible cantilever legs.

4. A ratchet type roll feed clutch comprising:
an annular central housing member;
a pair of disc-like side plates respectively secured to the opposite outer side faces of said central housing member;
a ratchet wheel rotatably mounted on and between said side plates, said ratchet wheel being disposed within said central housing member and having a plurality of teeth formed on the periphery thereof;
said side plates having a circular array of small bores formed therethrough, each such bore in one of said side plates being axially aligned with a related bore formed in the other side plate;
a pivot pin disposed in each of said related pairs of small bores, the axial outer ends of said pins being respectively exposed at at least one end thereof;
a pair of pawls pivotally mounted on each of said pins and adapted to drivingly cooperate with said peripheral teeth on said ratchet wheel;
spring means for yieldably biasing said pawls towards said teeth of said ratchet wheel; and
pin retaining means mounted on at least one of said side plates for retaining said pins in said bores.

5. Apparatus as defined by claim 4 wherein said pin retaining means includes at least one ring secured to an outer radial face of one of said side plates so as to cover and retain the adjacent ends of said pins.

References Cited

UNITED STATES PATENTS

| | | | |
|---|---|---|---|
| 895,712 | 8/1908 | Andersen | 145—72 |
| 747,013 | 12/1903 | Snyder | 81—58.2 |
| 1,427,223 | 8/1922 | Miller | 74—577 |
| 2,591,993 | 4/1952 | Aijala | 74—577 |
| 2,705,428 | 4/1958 | McCullough | 74—577 |

FRED C. MATTERN, Jr., Primary Examiner

W. S. RATLIFF, Jr., Assistant Examiner

U.S. Cl. X.R.

74—577